United States Patent

Grunditz et al.

[11] Patent Number: 5,297,742
[45] Date of Patent: Mar. 29, 1994

[54] METHOD AND DEVICE FOR THE TREATMENT OF WASTE

[76] Inventors: Leif Grunditz; Odd Karlsen, both of Roslagsvagen 101, Hus 15, Stockholm S-104 05, Sweden

[21] Appl. No.: 55,756

[22] Filed: May 3, 1993

Related U.S. Application Data

[63] Continuation of Ser. No. 778,070 filed as PCT/SE90/00318, May 11, 1990, abandoned.

[30] Foreign Application Priority Data

Jun. 5, 1989 [SE] Sweden ................................ 8902048

[51] Int. Cl.$^5$ .............................................. B02C 23/10
[52] U.S. Cl. .................................... 241/20; 241/21; 241/23; 241/24; 241/DIG. 38; 162/4; 162/55; 209/11
[58] Field of Search .................... 241/20, 21, 23, 24, 241/DIG. 38, 1, 41, 14, 29; 83/53, 177; 414/412; 162/4, 55; 209/11

[56] References Cited

U.S. PATENT DOCUMENTS

| | | | |
|---|---|---|---|
| 3,549,092 | 12/1970 | Baxter, Jr. | 241/21 X |
| 3,670,968 | 1/1972 | Galeano | 241/21 |
| 3,876,157 | 4/1975 | McIntire et al. | 241/DIG. 38 X |
| 3,951,731 | 4/1976 | Jetzer | 241/DIG. 38 X |
| 4,110,281 | 8/1978 | Dreer | 241/DIG. 38 X |
| 4,153,207 | 5/1979 | Cerroni | 241/DIG. 38 X |
| 4,219,381 | 8/1980 | Schnell | 241/21 X |
| 4,440,635 | 4/1984 | Reiniger | 241/DIG. 38 X |
| 4,562,969 | 1/1986 | Lindahl | 241/21 |
| 4,610,396 | 9/1986 | Serra et al. | 241/DIG. 38 X |
| 5,084,135 | 1/1992 | Brooks et al. | 241/20 X |
| 5,137,599 | 8/1992 | Maxham | 162/4 X |

FOREIGN PATENT DOCUMENTS 0054754 6/1982 European Pat. Off.
2198662 6/1988 United Kingdom.

*Primary Examiner*—Richard K. Seidel
*Assistant Examiner*—Kenneth E. Peterson
*Attorney, Agent, or Firm*—Dowell & Dowell

[57] ABSTRACT

A method an apparatus for treating waste, such as domestic garbage, industrial waste and the like, in which the waste is suspended in a liquid such as to obtain a slurry or a pulp. The constituents of the pulp or slurry are separated into different fractions in accordance with their density and/or magnetic properties or like features. Subsequent to having sorted (18, 24, 26) and removed objects from the pulp or slurry, the pulp or slurry is fed to a wet dryer (32) in which the pulp or slurry is kneaded. As a result, the composite material is separated into its respective constituents; for instance, plastic coatings are separated from their respective substrates, such as paper. The pulp or slurry is washed (36) downstream of the wet grinder (32), in order to remove plastic debris (40). The thus obtained fibre suspension is then led away for further treatment (44) or use. When producing the waste/liquid suspension, the suspension is heated to a temperature of at least 60° C., by delivering hot water or steam thereto. Hot water or steam may also be delivered to the wet grinder, in order to maintain the material therein at a temperature of at least 60° C.

7 Claims, 6 Drawing Sheets

METHOD AND DEVICE FOR THE TREATMENT OF WASTE

This application is a continuation of application Ser. No. 07/778,070, filed as PCT/SE90/00318, May 11, 1990, now abandoned.

BACKGROUND OF THE INVENTION

1. Field of the Invention

The present invention relates to a method for treating waste, such as domestic garbage, industrial waste and the like, in which the waste is suspended in a liquid and the constituents in the resultant waste pulp are separated into mutually different fractions in dependence on their density and/or magnetic properties or like features.

2. History of the Related Art

Many methods of separating and sorting the constituents of waste, such as domestic waste or garbage are known to the art. These methods include screening, magnetic separation and disintegration of the waste constituents by crushing, hammering and shredding. The waste is treated either in a dry or a wet state, either by drying the waste prior to treating the same, or by applying liquid to the waste such as to soak its various constituents and to facilitate transportation of the waste between different treatment stations.

For instance, for the purpose of separating plastics from paper, it is known to separate the constituents of the composite waste material by soaking said material in a first stage and then separating the plastic ingredient from the waste suspension in a second stage. This method, however, cannot be suitably applied as an incorporate stage in a continuous process for treating such wastes as domestic garbage, and is only suitable when treating a particular composite waste material.

Other methods for treating specific types of waste, such as waste paper for recycling, etc., are also known to the art, in which the waste is soaked and treated in different ways in order to separate contaminants from the useful part of the waste.

It can be ascertained that even though there are many processes by means of which the constituents of waste material can be sorted and separated from one another, the end product is often one which can only be deposited in dumps for degradation or decomposition over long periods of time, or incinerated at low incineration efficiency. Even though the end product might contain a large proportion of organic material, this material exists in a form in which decomposition takes a very long time, or in a form which makes effective incineration combustion difficult to achieve or which even requires input of additional of energy.

OBJECTS OF THE INVENTION

The main object of the present invention is to provide a method and apparatus for treating waste, such as domestic waste or industrial waste, in a continuous process such as to obtain, subsequent to mutually separating specific waste constituents, which are treated individually, an end product which has a high proportion of organic material and which can be readily recovered for decomposition, combustion, fermentation or a like subsequent treatment process.

Another object is to provide a method and apparatus for handling waste in which the constituents of composite material, such as plastic-coated paper and the like, can be readily separated from one another in the continuous process.

A further object is to provide a method and apparatus of the kind described in the introduction which enables effective separation of heavy and light, solid constituents which shall not be included in the end product.

These and other objects of the invention are achieved by the method and apparatus having the characteristic features set forth in the following claims.

The invention, together with its characteristic features and the advantages afforded thereby, will be apparent from the following description of exemplifying embodiments of apparatus for carrying out the method, made with reference to the accompanying drawings.

DESCRIPTION OF THE PREFERRED EMBODIMENT

Figure 1:
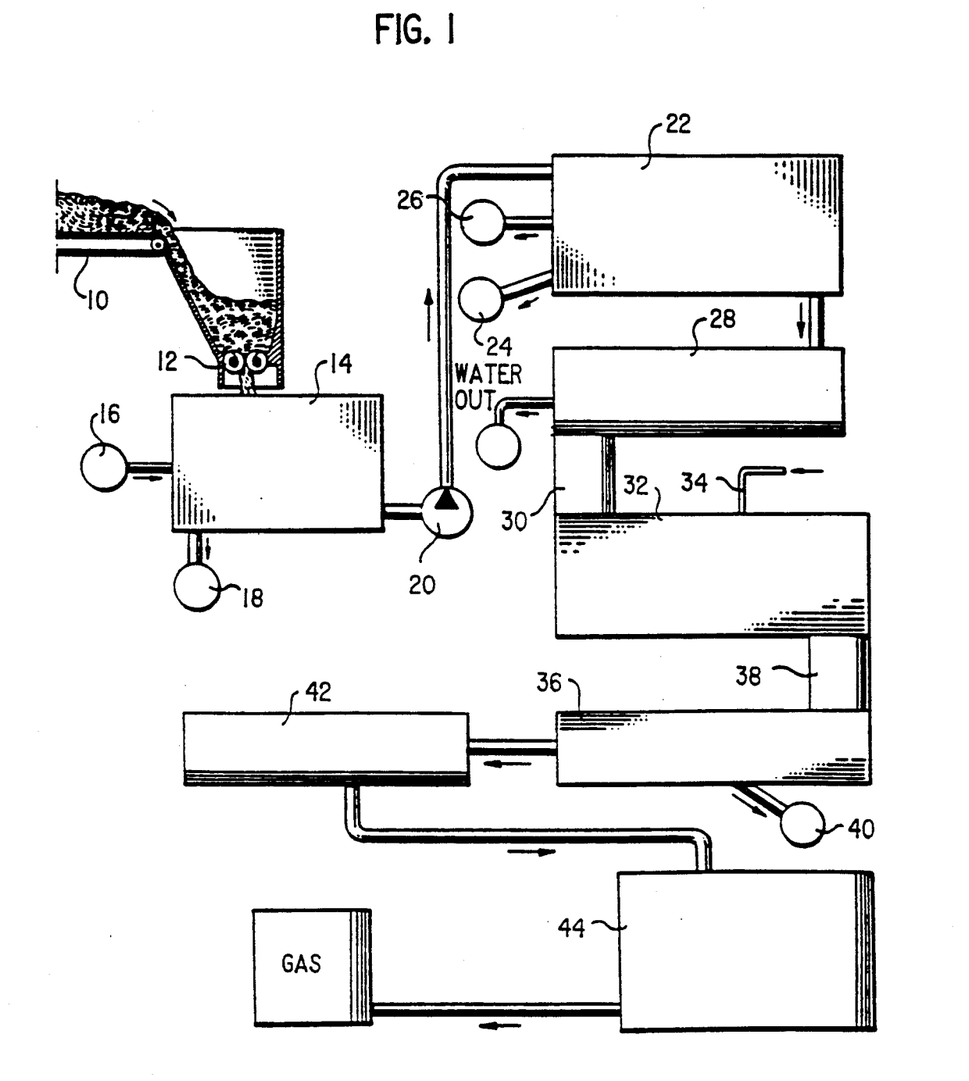
FIG. 1 is a block schematic of the various stations included in the inventive waste handling process, and shows the interconnection between said stations.

In the case of the plant illustrated in FIG. 1, the waste to be treated enters at 10, for instance on a conveyor belt. The waste is preferably in a free state, i.e. not packed in sacks, bags or the like. The waste is fed by means of conveyor screws 12 into a pulper 14, in which particularly heavy objects are sorted from the remaining waste, by disintegration. Treatment of the waste is facilitated by introducing liquid, such as water, at 16 and the heavy reject is discharged at 18, in a known manner. The resultant waste pulp is pumped by means of a pump 20 to a separator 22, in which the heavy and light solid constituents of the waste are separated from one another and removed respectively at 24 and 26. As will be described in more detail hereinafter with reference to FIGS. 3 and 4, the separator 22 separates from the waste pulp such material as scrap, for instance metals, batteries, etc., not already separated in the puler 14, and material such as light reject, pieces of cellulose plastic, fibre foam, etc.

The waste pulp is passed from the separator 22 to a dewatering screw 28, in which the pulp is given the moisture content desired for continued treatment thereof. The pulp is fed on an infeed screw 30 into a wet-grinding mill, such as a refiner 32, in which the pulp is ground and kneaded. This treatment results in the separation of composite materials, such as plastic-coated paper, which is divided into its respective constituents, while simultaneously exposing in depth the fibres contained by the waste pulp. As a result of the wet-grinding process, the material is mixed to a greater extent than is otherwise possible and the process also imparts to the pulp a larger specific surface area over which the pulp can be attacked to achieve biological decomposition of the pulp, if the pulp is deposited on waste dumps. The wet-grinding process also reduces the requisite storage volume of such terminal dumps. The refiner 32 may be provided with a conduit 34, for the introduction of steam to the wet-grinding process.

The pulp is passed from the wet-grinding mill 32 to a washer 36, with the aid of a screw feeder 38. The washer may be of any known kind and is preferably capable of washing from the pulp separated, unground pulp constituents, such as plastic coatings and the like, which depart through an outlet 40.

Figure 8:
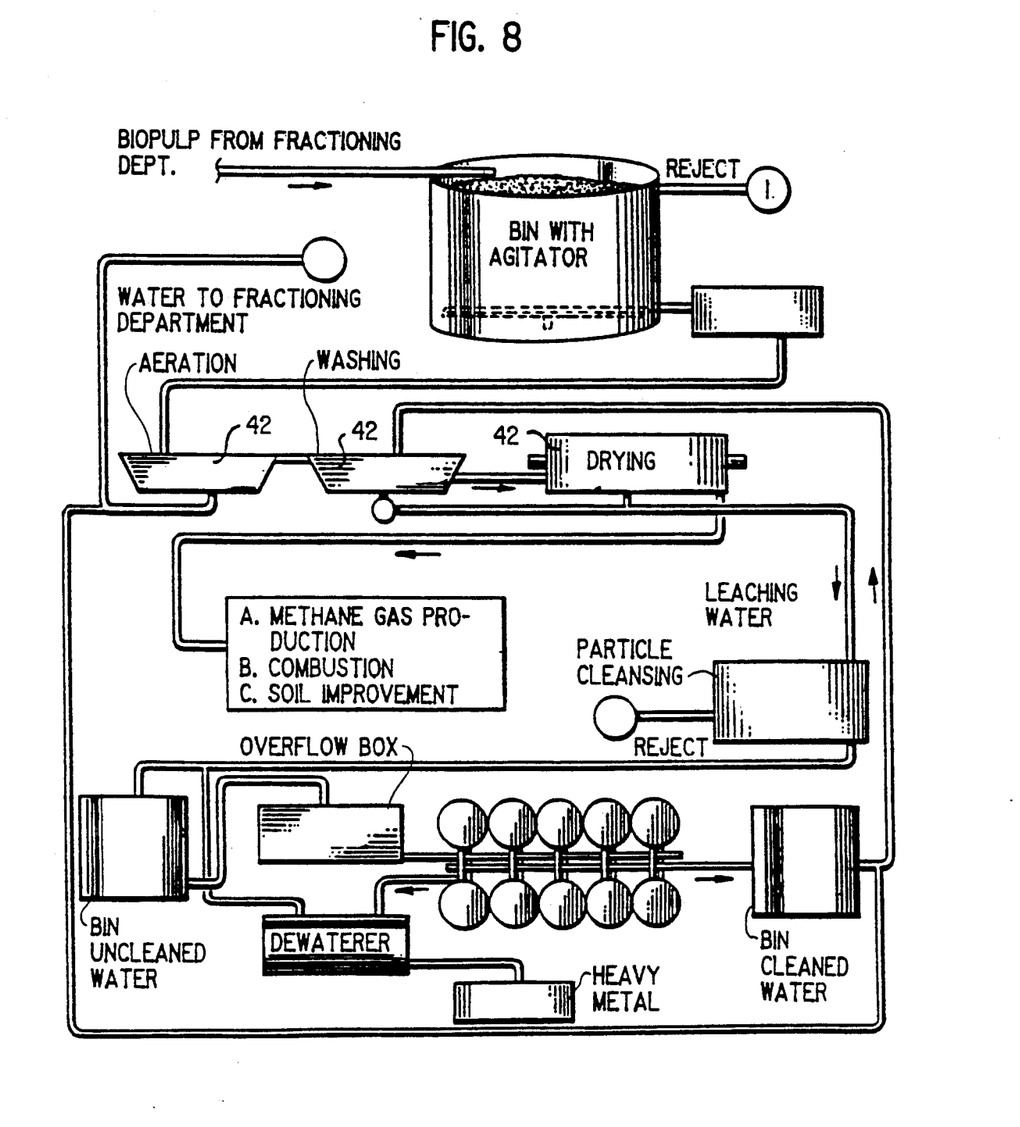
FIG. 8 illustrates schematically a plant for recovering the biopulp from the plant illustrated in FIG. 1 or FIG. 7.

Arranged downstream of the washer is a dewatering screw 42, in which the pulp is dewatered to a moisture content appropriate for subsequent treatment of the pulp. In the case of the illustrated embodiment, the dewatered pulp is passed to a fermentation vessel 44, in which the pulp, which now contains a high proportion of finely divided organic material, is allowed to ferment while generating gas which can be used for various purposes. As illustrated in FIG. 8, a dewatering screw 42 can be replaced with some other kind of dewatering device, such as a combined aeration, washing and drying device.

Figure 2:
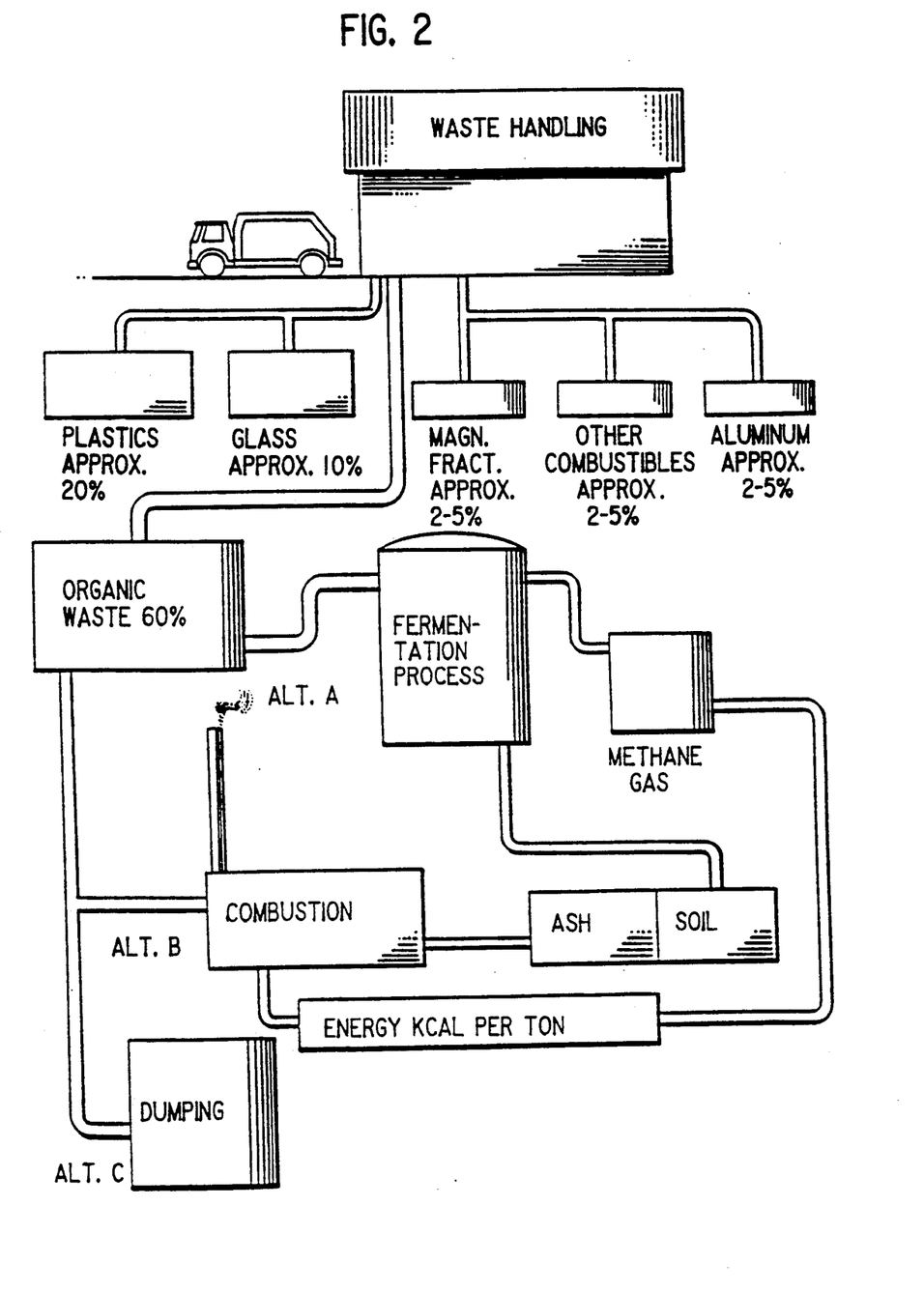
FIG. 2 is a block schematic which shows the division of waste into various fractions, and illustrates the continued treatment of the end product obtained in the process illustrated in FIG. 1.

FIG. 2 illustrates an example of an inventive process and also shows the proportions in which the various waste constituents are obtained when processing average domestic waste. The figure also illustrates three different alternatives for final treatment of the waste pulp produced, namely fermentation, as illustrated in FIG. 1, combustion incineration or dumping.

Figure 3:
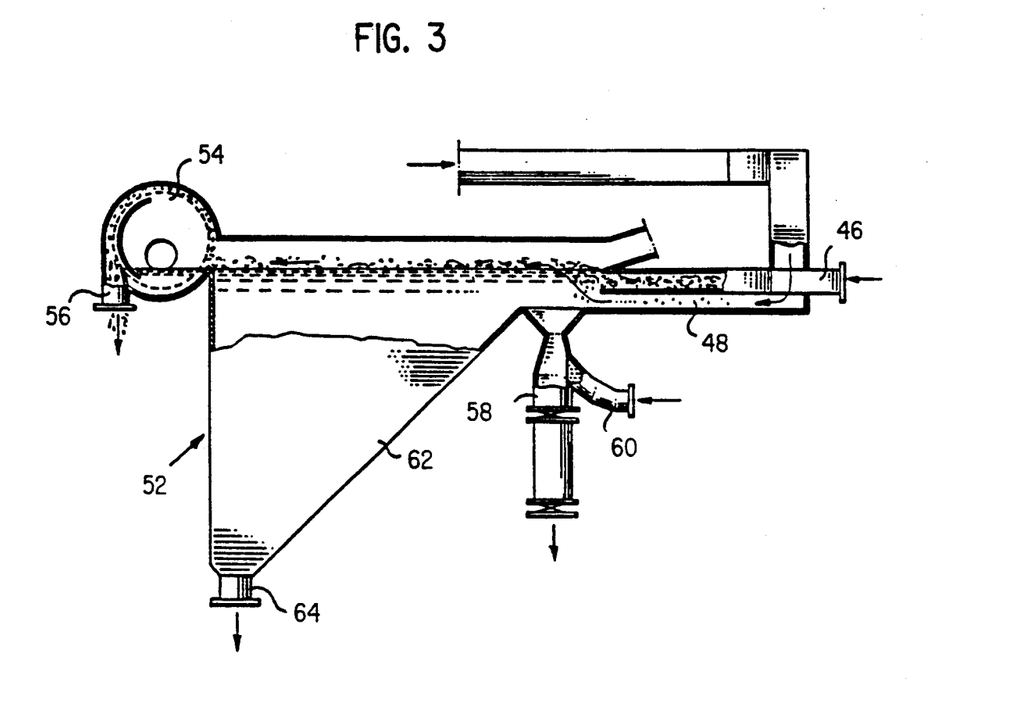
FIG. 3 is a sectional side view showing in detail a separator which forms part of the plant illustrated in FIG. 1.
Figure 4:
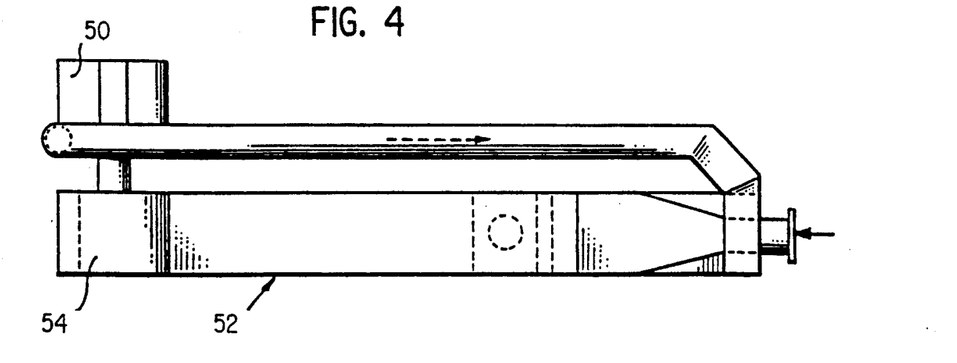
FIG. 4 is a top view of the separator shown in FIG. 3.

The FIG. 3 illustration includes a separator which forms part of the plant illustrated in FIG. 1 and which includes a pulp inlet 46 to which there is connected an air inlet 48, said air inlet being connected to the pulp inlet 46 in a manner which will enable pressurized air from a fan 50 to be mixed with the pulp. This admixture of air with the pulp results in the separation of light fractions, such as pieces of cellulose plastic, fibre foam, etc., which is removed with the aid of a screening drum 54 mounted on the upper part of the vessel or tank 52 centrally opposite the inlet 46. The drum 54 functions to capture the light reject and deliver said reject to an outlet 56. The vessel 52 is kept filled with pulp, so as to form an upper surface which is level with the inlet 46 and the lower part of the screening drum 54. Arranged down-stream of the inlet 46 is a scrap trap 58, into which heavy constituents, such as metal, batteries, etc. which have not earlier been separated from the pulp, are sorted out. Connected to the inner end of the inlet 46, adjacent the scrap trap 58 is a white-water inlet, at 60, which functions to produce an upstream so adapted that solely heavy reject is separated. The vessel 52 has downstream of the trap 58 a sloping wall 62 which leads to an outlet 64 for residual waste pulp.

Figure 5:
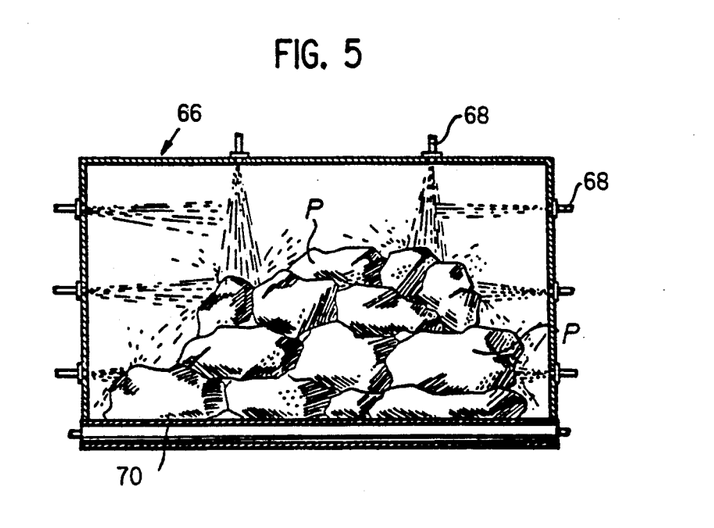
FIG. 5 is a sectioned side view of apparatus for disintegrating waste sacks or bags.
Figure 6:
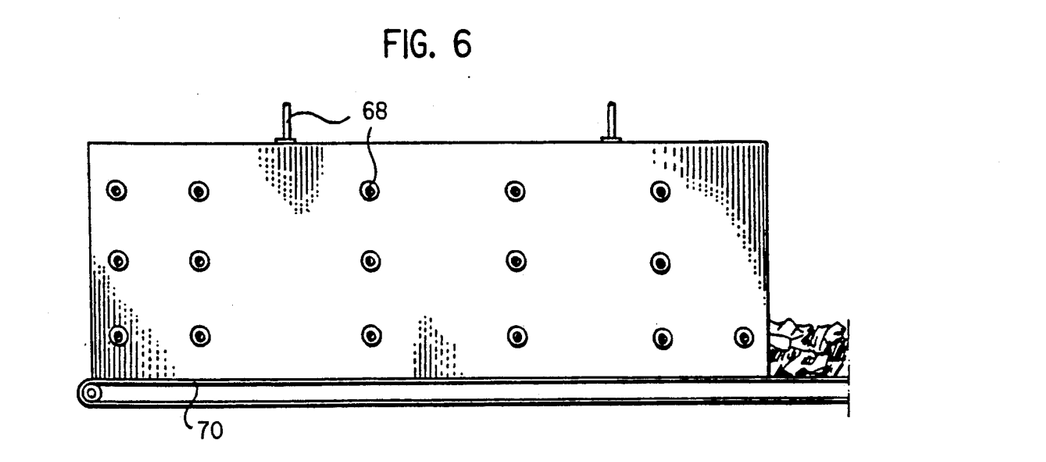
FIG. 6 illustrates the apparatus of FIG. 5 in a larger scale.

FIGS. 5 and 6 illustrate apparatus for preparing the waste for the process illustrated in FIG. 1. The majority of waste, for instance domestic waste, arrives packed in sacks or bags made of plastic or paper. For the purpose of releasing the contents of these sacks or bags, the sacks or bags P are fed into a vessel or tank 66 which is provided with a number of nozzles 68 through which liquid, such as water, is sprayed under very high pressure into the vessel 66. The fine, high-pressure water jets leaving the nozzles 68 therewith cut the sacks or bags P to pieces, thereby releasing the contents of the sacks or bags, which falls onto the conveyor belt 10 illustrated in FIG. 1. The bottom 70 of the vessel 66 may also constitute a base for the conveyor belt 10, in which case the vessel 66 has open ends for transportation of the sacks and the released waste into and from the vessel respectively. The water used to cut-up the sacks P also constitutes a first addition of dilution water which facilitates the continued transportation and handling of the waste.

Figure 7:
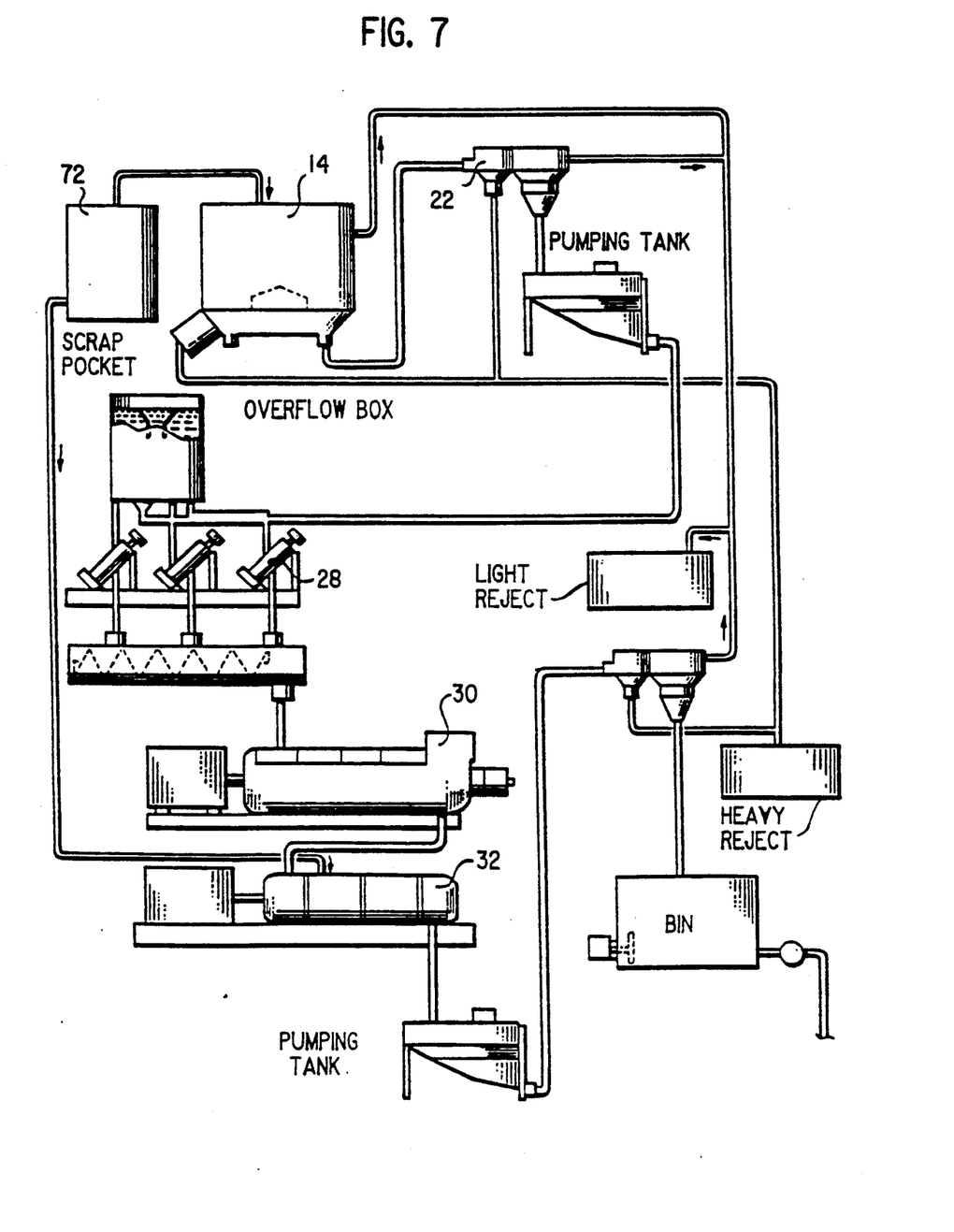
FIG. 7 illustrates schematically a modified form of the plant illustrated in FIG. 1.

FIG. 7 illustrates a modified plant for carrying out the invention. Those components or units of the modified plant which are similar to the plant illustrated in FIG. 1 have been identified with the same reference signs as their counterparts in the FIG. 1 embodiment. The modified plant also includes a source 72 of hot water or steam, said hot water having a temperature of at least 60° C. The hot water or steam is delivered both to the pulper 14 and to the refiner 32, thereby to heat these units to a temperature of at least 60° C., this temperature being maintained in all process stages. This arrangement enables the waste to be handled in a completely odorless manner, therewith enabling the illustrated fractionation plant to be located in areas which border on housing estates or similar built-up areas.

The wet method according to the present invention enables the constituents of domestic garbage to be separated effectively into their respective fractions. Although the method utilizes large quantities of water, very little water is actually consumed, because the outgoing concentrations in the process only slightly exceed the ingoing concentrations. No contaminated water leaves the process, and all water is recycled in the process.

In general, when practicing the inventive method, the domestic garbage is separated into four categories, namely:
1) Products having a density of between 1 and 1.5. This category, or group, is primarily composed of organic products, such as food residues, paper waste, etc. This material is a biopulp.
2) Products having a density below 1. This category is dominated by plastic waste.
3) Products having a density of 1.5 or higher and which cannot be influenced magnetically, for instance stones, glass and non-metallic metals.
4) Products which have a density of 1.5 or higher and which can be influenced magnetically. This category includes different types of metals.

The above densities being in $Kg/m^3$.

This division of the waste into different categories greatly improves the further processing of the waste from an environmental aspect. This applies irrespective of whether the intention is to recover gas, to burn the waste or to simply dump it.

As is evident from the aforegoing, there is achieved by the inventive process a division of domestic waste into the following fractions, namely:
Organic fraction (biopulp)
Plastics
Magnetic fraction
Other non-combustibles such as stones, sand, glass, etc.

Large quantities of water are used in the process to achieve this fractionation. The concentrations vary between 2–33%.

The organic fraction is transported from the storage cell to the pulper with the aid of a conveyor belt. The pulper is a round bin having a volumetric capacity of about 30 m³ and it is constructed as a traditional pulper used within the paper pulp industry. The illustrated pulper, however, has been modified in several respects, in order to suit the raw material present in the domestic wastes. The pulper functions to separate fractions which have a density above 1.5, in separate so-called scrap pockets. Surface suspension or supernatent in the pulper is drawn-off, therewith separating a fraction whose density is beneath 1.0. In the following, all fractions having a density beneath 1.0 are designated light reject, whereas fractions having a density above 1.5 are designated heavy reject. The fraction whose density lies between 1.0 and 1.5, which is an organic fraction, is designated accept. The wastes are treated in the pulper at a concentration of 3%. Hot water or steam is delivered to the pulpers, in order to obtain therein a temperature of 60° C. and higher. The suspension is maintained at a temperature of 60° C. or higher in all treatment stages.

The accept obtained from the pulper is thereafter pumped to a so-called frigocell (a separator) and thinned so as to obtain a frigocell concentration of 2.5%. As the suspension passes through the frigocell, those heavy particles having a density greater than 1.5 fall down into a scrap trap. Air is injected into the bottom of the frigocell, such as to transport the lighter fraction in the suspension up to the surface in the frigocell. This light reject is caught in a separate device. In this way, separation is achieved of particles whose density is either beneath 1.0 or above 1.5.

The accept is transferred to a dewatering unit, via a pump tank and a spillway or wier, so as to enable the concentration to be increased to 33%. This concentration is necessary in order to separate residual plastic in the refiner.

The waste material is finely divided still further in the refiner. Hot water or steam is delivered to the refiner, so that the continued process can be effected at a temperature of 60° C. or higher. Because of the unique properties of this machine, the plastic film affixed to milk cartons, among other things, is completely released therefrom. The refiner functions to finely divide the major part of the organic fraction to particles having a maximum size of 30 mm.

Subsequent to the refining stage, water is supplied to a so-called pump tank in which consistencies of about 2% are achieved, such consistencies being necessary to enable the separation of freely suspended plastic film, and washing of the suspension. The suspension is washed, for instance, on a vibratory screen or frigo-cell. The accept is now practically free from all plastic and is transferred to the biopulp treatment department.

FIG. 8 illustrates a plant for handling biopulp obtained from the plant illustrated in FIG. 1 or in FIG. 7. There is obtained from the fractionating department an accept which is a biopulp fraction composed of cellulose fibres, vegetable fibres, animal products, etc. The accept has a concentration of about 2%. This process stage is intended to produce a biopulp which is free from heavy metals and which has a moisture content of about 10%. This biopulp can either be burned (incinerated), used as a soil improver or used to produce biogas. The moisture content of the biopulp normally lies between 7 and 9%?.

The biopulp is pumped into a bin and kept in the bin for a period of from 5 to 10 minutes. The ingoing biopulp has a pH of 6.5 to 7. When reducing the pH to 4.5 at the lowest, certain particle-bound heavy metals are released and mixed with the water. The pH of the biopulp is lowered by adding an acid thereto. The pH of the biopulp is then raised to about 6.5. This pH-increase is effected by mixing a basic substance with the biopulp.

The concentration of the biopulp is increased from 2% to 20%, by aeration.

The biopulp now contains about 80% water, which is contaminated with heavy metals, salts, etc., among other things. This water is replaced with clean water in a washing stage.

Subsequent to being washed, the biopulp is transferred to a dryer in which the moisture content is reduced to about 10–70%. Further treatment of the biopulp is contingent on its intended use. If the biopulp is to be used to produce biogas, the concentration should be about 30%. When the biopulp is intended to be burned, the moisture content is preferably about 10%, so that more energy can be recovered. Pelletization of the biopulp facilitates both storage and combustion of the pulp.

The water removed by suction in the washing stage contains significant quantities of heavy metals and different salts. The heavy metals are recovered in a separate process. The water which remains subsequent to recovering the heavy metals can either be vaporized or discharged to the municipal sewage system.

We claim:

1. A method of treating waste comprising the steps of:
    A. suspending the waste in a liquid in a pulper to form a waste pulp;
    B. initially sorting heavy objects from the waste pulp to form a resultant waste pulp having heavy and light fractions;
    C. separating and removing the heavy and light fractions from the waste pulp;
    D. thereafter, at least partially dewatering the waste pulp;
    E. kneading the at least partially dewatered waste pulp through a grinding means to thereby obtain a kneaded waste pulp containing free fibers and unground fractions;
    F. delivering hot water or steam to the grinding means so as to maintain the at least partially dewatered waste pulp being kneaded therein at a temperature of at least 60° C.;
    G. washing the kneaded waste pulp to separate the unground fractions therefrom to form a fiber pulp suspension; and
    H. conveying the fiber pulp suspension for further treatment.

2. The method of claim 1 including the additional step of delivering hot water or steam to the waste in the pulper so as to maintain the temperature of the waste pulp to at least 60° C.

3. The method of claim 2 including the additional step of delivering hot water or steam to the fiber pulp suspension to heat the fiber pulp suspension to a temperature of at least 60° C.

4. A method of treating waste comprising the steps of:
    A. suspending the waste in a liquid to form a waste pulp;
    B. separating and removing heavy and light fractions from the waste pulp;

C. kneading the waste pulp through a grinding means to thereby obtain free fibers and separated composite material including unground fractions while supplying hot water or steam to the grinding means to maintain a temperature of at least 60° C. of the waste pulp;

D. separating the unground fractions from the waste pulp to form a fiber pulp suspension; and E. conveying the fiber pulp suspension for further treatment.

5. The method of claim 4 in which the waste is originally retained in containers including the additional step of directing high pressure water jets to the containers to tear the containers and discharge the waste therefrom prior to suspending the waste in a liquid to form the waste pulp.

6. A method of treating waste in which the waste is initially retained in containers such as sacks and bags made of plastic or paper comprising the steps of:

A. initially releasing the waste from the containers by spraying high pressure water jets at the containers to thereby disintegrate the containers;

B. suspending the waste in a liquid in a pulper to form a waste pulp;

C. initially sorting heavy objects from the waste pulp to form a resultant waste pulp having heavy and light fractions;

D. separating and removing the heavy and light fractions from the waste pulp;

E. thereafter, at least partially dewatering the waste pulp;

F. kneading the at least partially dewatered waste pulp through a grinding means to thereby obtain a kneaded waste pulp containing free fibers and unground fractions;

G. washing the kneaded waste pulp to separate the unground fractions therefrom to form a fiber pulp suspension; and H. conveying the fiber pulp suspension for further treatment.

7. A method of treating waste comprising the steps of:

A. suspending the waste in a liquid to form a waste pulp:

B. separating and removing heavy and light fractions from the waste pulp:

C. deodorizing the waste pulp by supplying hot water or steam to the pulp to maintain the waste pulp at a temperature of at least 60° C.;

D. kneading the waste pulp through a grinding means to thereby obtain free fibers and separated composite material including unground fractions;

E. separating the unground fractions from the waste pulp to form a fiber pulp suspension; and F. conveying the fiber pulp suspension for further treatment.

* * * * *